United States Patent [19]

Krieg et al.

[11] Patent Number: 4,773,913
[45] Date of Patent: Sep. 27, 1988

[54] ACRYLATE RESINS AS BINDERS FOR COLOR CONCENTRATES

[75] Inventors: Manfred Krieg, Darmstadt; Hans Lichtenstein, Babenhausen; Ludwig Hosch, Michelstadt; Guenther Ittmann, Gross-Umstadt, all of Fed. Rep. of Germany

[73] Assignee: Röhm GmbH, Darmstadt, Fed. Rep. of Germany

[21] Appl. No.: 4,239

[22] Filed: Jan. 2, 1987

Related U.S. Application Data

[63] Continuation of Ser. No. 821,866, Jan. 22, 1986, abandoned, which is a continuation of Ser. No. 623,026, Jun. 21, 1984, abandoned.

[30] Foreign Application Priority Data

Jul. 2, 1983 [DE] Fed. Rep. of Germany ....... 3323951

[51] Int. Cl.⁴ .............................................. C09B 67/00
[52] U.S. Cl. .......................................... 8/552; 8/553; 526/258; 526/260; 526/263; 526/265; 526/307; 526/307.7
[58] Field of Search .......................... 8/552, 555, 557; 526/307.7, 307, 258, 260, 263, 265

[56] References Cited

U.S. PATENT DOCUMENTS

| | | | |
|---|---|---|---|
| 3,240,740 | 3/1966 | Knapp et al. | 8/555 |
| 3,471,433 | 10/1969 | Bradley et al. | 260/32.6 |
| 3,474,081 | 10/1969 | Bosworth | 260/89.5 |
| 3,907,727 | 9/1975 | Lipp | 260/17 R |
| 4,071,653 | 1/1978 | Boessler et al. | 526/263 |
| 4,147,685 | 4/1979 | Smith, Jr. | 526/279 |
| 4,302,562 | 11/1981 | Becher et al. | 526/265 |
| 4,303,560 | 1/1981 | Takahoski et al. | 526/320 |
| 4,316,929 | 2/1982 | McIntire et al. | 526/317 |
| 4,384,097 | 5/1983 | Wingler et al. | 526/328.5 |

FOREIGN PATENT DOCUMENTS

| | | |
|---|---|---|
| 106877 | 9/1962 | Czechoslovakia . |
| 22746 | 1/1981 | European Pat. Off. . |
| 1248291 | 8/1967 | Fed. Rep. of Germany . |
| 1592897 | 3/1971 | Fed. Rep. of Germany . |
| 2639752 | 11/1977 | Fed. Rep. of Germany . |
| 2841540 | 4/1980 | Fed. Rep. of Germany . |
| 2842719 | 10/1980 | Fed. Rep. of Germany . |
| 50-092386 | 7/1975 | Japan . |
| 1148168 | 4/1969 | United Kingdom . |
| 1197053 | 7/1970 | United Kingdom . |
| 1237164 | 6/1971 | United Kingdom . |
| 1282634 | 7/1972 | United Kingdom . |
| 1405070 | 9/1975 | United Kingdom . |
| 2014157 | 8/1979 | United Kingdom . |

OTHER PUBLICATIONS

Brandrup.Immergut, *Polymer Handbook*, 2d Edition, Wiley & Sons, New York, III 144-148.

*Primary Examiner*—Joseph L. Schofer
*Assistant Examiner*—Peter F. Kulkosky
*Attorney, Agent, or Firm*—Curtis, Morris & Safford

[57] ABSTRACT

Color concentrates comprising a colorant such as a pigment and a polymeric binder, and polymeric binders therefor, said polymeric binders comprising:

(a) 70-90 percent of methyl methacrylate, by weight of the polymer;
(b) 10-20 percent of methyl acrylate; and
(c) from 0 to 10 percent of at least one free radically polymerizable monomer of the formula

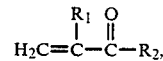

wherein $R_1$ is hydrogen or methyl and $R_2$ is a moiety carrying a functional group.

16 Claims, No Drawings

ACRYLATE RESINS AS BINDERS FOR COLOR CONCENTRATES

This application is a continuation of application Ser. No. 821,866, filed Jan. 22, 1986, which is a continuation of application Ser. No. 623,026, filed June 21, 1984, both now abandoned.

The present invention relates to color concentrates and to acrylate and methacrylate synthetic resins adaptable to use as binders for such color concentrates.

Colorants which permit practically any desired coloring are available to the industry for the coloring of synthetic resins. Such resins are mainly colored either in bulk as they are produced or during the processing of the resins in powder or granular form. The coloring method is adapted to the particular resin.

Color concentrates formed between colorants, particularly pigments, and binders and known as masterbatches are advantageously used for incorporating the colorants into synthetic resin monomers or prepolymers. Similar techniques are used to color plastics in powdered or granular form.

The main difficulty usually lies in securing a uniform dispersion of the pigment in the pigment concentrates, which is a prerequisite for uniform pigment dispersion in the resin. Pigment agglomerations in resins invariably have an adverse effect on their mechanical and optical properties.

The mechanical dispersion of colorants in synthetic resin has been dealt with in many patent publications. Published German patent application DOS No. 12 48 291 discloses pigment concentrates for the coloring of synthetic resins comprising polyvinyl chloride, in the preparation of which granular PVC and finely divided pigments and additives are subjected to high shear forces at temperatures below their melting point.

According to published German patent application DOS No. 15 92 897, pigment masses for the coloring of thermoplastic resins are obtained inter alia by mixing the finely divided pigment in the aqueous phase with an emulsion or solution of the vehicle, with formation of an unagglomerated mixture, and then spray drying the latter.

British patent No. 1,148,168 describes the production of specific types of solid color concentrates wherein a pigment in paste form (obtained by electrolytic precipitation from an aqueous dispersion) and a phenolic resin containing an unesterified rosin (obtained by precipitation from an aqueous salt solution) are mixed.

According to U.S. Pat. No. 3,471,433, masterbatches are obtained from pigment dispersions in acrylate resins when a strong acid is mixed with formamide or acetamide, the pigment is dispersed therein, and a viscous acrylic polymer (for example, an acrylonitrile/vinyl acetate and methylvinylpyridine copolymer) is added with stirring.

The emulsion polymerization of vinyl monomers such as butyl acrylate/acrylonitrile with the addition of 0.1 to 20 percent of monoallyl maleate in an aqueous suspension of a pigment followed by grafting with vinyl monomers (styrene/acrylonitrile) yields pigment concentrates which can be processed with polymers such as ABS resins to give uniformly colored mixtures. (Japanese patent publication No. 50-092386.)

According to published German patent application DOS No. 28 41 540, colorants for incorporation in plasticized polyvinyl chloride are obtained by the mechanical mixing of polymers of aromatic vinyl compounds, 2-alkenecarboxylic acids or monoalkyl esters of 2-alkenecarboxylic acids, and alkyl acrylates or methacrylates in the molten state with pigments, kneading above 100° C., cooling, and grinding.

According to Czech patent No. 106,877, polymethyl methacrylate, titanium dioxide, and lead stearate are plasticized at about 170° C. and the concentrate so obtained is suspended in methyl methacrylate. To produce colored acrylic glasses, defined herein as rigid homopolymers and copolymers of acrylate esters and/or methacrylate esters having a Vicat softening temperature of 80°-120° C. (as determined according to DIN 53460 or IS 306), the suspension is mixed with a prepolymer and completely polymerized in a mold.

The prior art colorants for the coloring of acrylic glasses (as defined above) in bulk do not meet all the necessary requirements. These requirements relate both to the ease of incorporating the color concentrates and to the way the concentrates affect acrylic glasses colored therewith.

For example, the color concentrates should be readily soluble in the monomers or prepolymers. Moreover, they should not adversely affect the course of polymerization or removal from the mold. The pigments should be well dispersed in the polymerization formulation. Above all, the disperse state of the pigments should be sufficiently stable, that is to say, no sedimentation or reagglomeration of the pigments should occur. A desideratum is that the dispersions prepared with the color concentrates be stable for a period of hours or even days.

The colorants or pigments should be readily dispersible mechanically to give a color concentrate, for example a dry pigment concentrate.

Further processing of the acrylic glasses following completion of polymerization, such as annealing, forming, stretching, etc., should not be adversely affected.

The other mechanical properties of the colored acrylic glasses, their Vicat softening temperature, and their weatherability should not be inferior to those of regular acrylic glasses.

It has been found that these requirements are fully satisfied by colorants prepared in accordance with the invention with polymeric binders comprising (a) 70-90 percent, by weight of the polymer, of methyl methacrylate, (b) 10-20 percent, by weight of the polymer, of methyl acrylate, and (c) 0-10 percent, by weight of the polymer, of at least one free radically polymerizable monomer of the formula

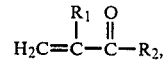

wherein $R_1$ is hydrogen or methyl and $R_2$ is
(i) —OH,
(ii) —$NR_3R_4$, wherein $R_3$ and $R_4$, taken alone, are the same or different and are hydrogen or linear or branched alkyl having 1 to 5 carbon atoms, and $R_3$ and $R_4$, taken together with the nitrogen atom to which they are bonded, form a 5- or 6-membered heterocycle or such a heterocycle containing further nitrogen or oxygen atoms,
(iii) —Y—X—$NR_3R_4$, wherein
Y is oxygen or —$NR_5$—, X is linear or branched alkylene having 2 to 10 carbon atoms or is cycloalkylene, and
R$_5$ is hydrogen or alkyl having 1 to 6 carbon atoms,
(iv) —Y—X—OH,
(v)

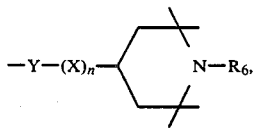

wherein n is 0 or 1 and R$_6$ is hydrogen or alkyl having 1 to 6 carbon atoms,
(vi) —Y—X—Si—(OR$_7$)$_3$, wherein R$_7$ is alkyl having 1 to 6 carbon atoms, or
(vii)

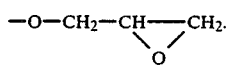

The polymeric binders of the invention can readily be dispersed with the pigments, for example, by means of rolling and kneading equipment, to give a dry pigment concentrate. The polymer is composed predominantly of methyl methacrylate but includes also methyl acrylate. While preparations with a satisfactory degree of dispersion of the pigment or pigments can be obtained with polymers of this type when used in a weight ratio from 6:1 to 3.3:1, mainly as a result of the shearing action of the dispersing equipment, the stability of the disperse state of the pigment mixtures in the polymer formulations, which consist essentially of methyl methacrylate/polymethacrylate, cannot always be maintained for the necessary length of time.

However, adequate stability will always be secured when at least one further monomer component (c) is added to the methyl methacrylate and methyl acrylate components in an amount of at least 0.1 percent by weight of the polymer, preferably in an amount from 1 to 6 percent by weight. It may be hypothesized that the binder molecules are adsorbed in sufficient number on the pigment surface through functional groups and thus form a stabilizing envelope around the pigment particles which prevents their flocculation.

Particularly preferred is the addition of nitrogen bearing monomers of the types (c) (ii) and (iii) identified above. Of special advantage is the presence of type (c) (iii) monomers with branching in the alkylene chain X, and particularly of type (c) (iii) monomers having a tertiary carbon atom in the alkylene chain. These include compounds in which X represents 2,2-dimethylpropyl, and particularly 3-dialkylamino-2,2-dimethyl-propyl-1-methacrylate, and more particularly the 3-dimethylamino and 3-diethylamino compounds. Binders containing these monomers are distinguished by ease of handling, among other things, particularly in removal from the mold, and generally meet the practical requirements set forth above particularly well.

Polymeric binders in which component (c) is formed of or comprises at least one of the monomers:
2-dimethylaminoethyl acrylate and/or methacrylate,
2-diethylaminoethyl acrylate and/or methacrylate,
2-dimethylaminopropyl acrylate and/or methacrylate, or
2-diethylaminopropyl acrylate and/or methacrylate have also proved themselves.

Combinations with one or more monomers containing hydroxyl groups, for example of the types (c) (i) or (c) (iv), are also advantageous.

A weight ratio of (a):(b):(c) of 4.2±0.7:1:0.3±0.2 will serve as a guide. The polymers generally have a reduced viscosity $\eta_{sp}/c$, ranging from 10 to 70, and preferably from 15 to 30, ml/g in CHCl$_3$ at 20° C. The viscosity is determined in conformity with DIN 1342 by means of an Ubbelohde microviscometer.

The colorants used to prepare the color concentrates from the binders of the invention are colorants which are suitable also for the coloring of the polymers, in other words, both inorganic and organic dyes and pigments. They are listed in the prior art for the coloring of specific polymers. (See Vieweg-Esser, Kunststoff-Handbuch ["Plastics Handbook"], vol. IX, Polymethacrylates, Carl Hanser Verlag, 1975.)

Foremost among these are carbon black, yellow and red pigments comprising cadmium sulfide and/or calcium selenide, phthalocyanine blue and green, and the like.

The concentration of colorant in the binders of the invention will generally range from 10 to 70 weight percent and preferably is from 30 to 60 weight percent. The colorants may be incorporated in the binders of the invention conventionally by the use of sufficiently high shear forces. Suitable dispersing equipment includes kneaders, roller mills, and the like.

The masterbatches (polymeric binders containing colorants) usually represent from 0.05 to 3 weight percent, and preferably from 0.1 to 1.5 weight percent, of the total polymerization formulation, which generally consists of monomers, and preferably a prepolymer, binder, and optional additives. They may be incorporated in intermediates such as syrups, prepolymers, and/or in monomers which are used in the prior art for polymerization of acrylic or methacrylic resins (matrix polymers) in the usual manner, for example by being stirred into them.

The subsequent steps, for example, pouring the syrup into polymerization cells serving as molds, the polymerization which follows, removal from the molds, etc., may be carried out in keeping with prior art methods.

Surprisingly, it is also possible to carry out the incorporation by introducing a dispersion of the colorants in a polymeric binder formed only of components (a) and (b) into the polymerization intermediates of a methacrylic resin simultaneously with a sufficient amount of a polymeric binder formed of components (a), (b), and (c). The latter binder is evidently adsorbed rapidly enough on the pigment surface from the solution. Based on recognition of this fact, the coloring procedure for batches with different pigment preparations can be largely standardized since it will suffice always to add the same but adequate amount of a polymeric binder formed of (a), (b), and (c).

The polymeric binders of the invention are suited primarily for incorporation into acrylic resins produced by bulk polymerization. Articles molded therefrom will find use particularly in industry, in sanitary applications, and in households, where resistance to common solvents and good mechanical properties are required.

Such acrylic resins (matrix polymers) usually are composed entirely or to a large extent of esters of acrylic acid and of methacrylic acid, and particularly of methyl methacrylate, as monomers, and optionally also of other copolymerizable monomers in addition to methyl methacrylate.

For example, matrix polymers comprising methyl methacrylate may further contain from 0 to 45 weight percent of other comonomers. These may be other esters of methacrylic acid or of acrylic acid, for example methyl acrylate, butyl acrylate, alpha-chloromethyl acrylate, or ethyl methacrylate, or may be optionally substituted amides of acrylic acid or of methacrylic acid, such as acrylamide, methacrylamide, methylolmethacrylamide, and methylolacrylamide, or may be acrylonitrile, styrene, or styrene derivatives such as alpha-methylstyrene, or may be vinyl esters of carboxylic acids, such as vinyl acetate and the like.

The presence of crosslinking monomers such as ethylene glycol dimethacrylate, 1,4-butanediol dimethacrylate, triglycol dimethacrylate, or trimethylolpropane trimethacrylate, or of allyl compounds such as allyl methacrylate, triallyl cyanurate, or triallyl isocyanurate, is highly desirable.

Polymerization may be carried out conventionally utilizing the practical experience of the art. (See H. Rauch-Puntigam and Th. Vöker in "Acryl- und Methacrylverbindungen", Springer-Verlag, 1967, and J. Brandrup and E. H. Immergut, Polymer Handbook, 2nd ed., Wiley-Interscience, 1975.) Appropriate techniques have been outlined in German patent No. 639,095.

The preparation of matrix polymers and of the resin binders of the invention is discussed below.

For preparing the matrix polymer, peroxide or azo compounds may be employed in the usual amounts as initiators for the free radical polymerization of the monomers (such as acrylic monomers, styrene and styrene derivatives, and esters of vinyl compounds). For regulation of the molecular weight, conventional modifiers (chain transfer agents) such as organosulfur compounds may be employed in the usual concentrations. As is known, the degree of polymerization, and hence the molecular weight of the resin, can be controlled through the initiator concentration and/or the modifier concentration. In the polymerization of acrylic resins, from 0.01 to 1.0 percent of initiator, by weight of the monomer, will normally be used, while the modifier added will generally range from 0.01 to 0.5 percent, and preferably from 0.05 to 0.2 percent, by weight of the monomers. As a rule, the molecular weight of the matrix polymers will range from $2 \times 10^5$ to $5 \times 10^6$. In most cases, the matrix polymer will be weakly crosslinked. The Vicat softening temperature (determined in conformity with DIN 53460, procedure B) will usually be above 100° C. The polymerization formulation may further contain conventional additives such as UV absorbers, plasticizers, light and heat stabilizers, antioxidants, flame retardants, etc.

The polymeric binder may also be prepared by techniques based on prior art polymerization methods (cf. the discussion immediately above.) For example, polymerization may be carried out to advantage in foil pouches in accordance with Belgian patent No. 695,342. Polymerization is usually initiated by compounds forming free radiaals, and preferably by peroxide or azo compounds present in the usual amounts (normally between 0.02 and 0.1 percent, by weight of the monomers). The known redox systems, accelerators, etc., may also be used to advantage. (See H. Rauch-Puntigam, "Acrylund Methacrylverbindungen", Springer-Verlag, 1967.) For regulation of the molecular weight, such known modifiers as organosulfur modifiers may also be used here in the usual concentrations. The amount of modifier added will generally range from 0.1 to 5 weight percent, and preferably from 0.5 to 3 weight percent.

In the case of a polymer comprising components (a), (b), and, optionally, (c), the components along with the additives, plasticizers, and optional lubricants, etc., are advantageously mixed intensively by stirring and polymerized in a pouch made of a suitable plastic, for example, of a polyethylene terephthalate copolymer, in a layer several centimeters thick and at elevated temperature, for example about 50°±10° C. (water bath) for a sufficiently long period of time of up to two days, with 24 hours serving as a guide. For the final polymerization, the temperature is advantageously again raised, for example to about 100° C., for a period of about 16 hours.

The polymer so obtained is removed from the mold and preferably comminuted, for example by grinding to a particle size appropriate to further processing. For the production of a dry pigment preparation, an average particle size of about 1 mm will serve as a guide. In this case, the molecular weight of the polymer should be on the order of 40,000±15,000.

Dry pigment preparations can be produced from the binders of the invention by techniques based on prior art methods.

The binder polymer, preferably in ground form, and the pigment are intensively mixed in a suitable mixing apparatus, for example a drum mixer. The pigment/polymer mixture is then charged to a suitable roller mill, for example a two-roll mill, and milled, usually at elevated temperature, for example 90° to 100° C., or dispersed in a kneader such as a ZSK kneader or also a pestle kneader. After the polymer/pigment mixture has become thermoplastic and the pigment is completely enclosed, the mixture is preferably milled once more, the masterbatch sheet is then taken off, allowed to cool, and ground to a powdery consistency.

For the production of a colored acrylic glass panel for instance, here, too, a procedure based on prior art methods may be employed. For example, an acrylate prepolymer which has been mixed with the usual polymerization additives may be used as the starting material. The dry pigment preparation produced in accordance with the invention is then introduced into the formulation, which then is intensively mixed by means of an agitator for example, preferably allowed to stand for a while, and then poured into the polymerization cell. Polymerization is carried out in the usual manner and is normally followed by a final polymerization at elevated temperature, for example at about 120° C. in an annealing cabinet. The colored acrylic glass panels removed from the molds exhibit optimum pigment dispersion and, after heating to forming temperature, and also after stretching, have flawless surfaces.

The binders of the invention meet the practical requirements set forth earlier to a high degree.

The color concentrates readily dissolve in the monomers or prepolymers. Adding them has no adverse effect on the course of polymerization. They offer substantial advantages over prior art color concentrates especially with regard to removal from the mold. For example, the fractures which are frequently encountered in removing the resin sheet from the mold are minimized or completely absent. Another advantage is the relative stability of the disperse state.

The processing operations which follow the completion of polymerization, such as annealing, forming, stretching, etc., can readily be carried out.

The mechanical and optical properties of the colored acrylic glass substitutes and their Vicat softening temperature and weatherability are comparable to those of regular acrylic glass substitutes.

A better understanding of the invention and of its many advantages will be had by referring to the following specific Examples, given by way of illustration.

EXAMPLE 1

Preparation of a polymeric binder containing components (a) and (b)

Formulation 828 g of methyl methacrylate;
150 g of methyl acrylate;
2 g of dilauroyl peroxide; and
20 g of 2-ethylhexyl thioglycolate.

The formulation is vigorously stirred and polymerized for 25 hours in a plastic pouch, made of a polyethylene terephthalate copolymer, in a layer from 1 to 2 cm thick, in a water bath at about 50° C. Final polymerization is carried out for 10 hours at 100° C. The polymer removed from the mold is colorless and clear and is then ground to an average particle size of less than about 1 mm.

The molecular weight is about 40,000, and the reduced viscosity is 20±2 cm$^3$/g.

EXAMPLE 2

Preparation of a dry pigment composition 200 g of the polymer binder of Example 1, ground, and 200 g of cadmium sulfide/selenide are vigorously mixed in a tumbling mixer. A two-roll mill is heated to from 90° to 100° C. and the pigment/polymer mixture is charged to the mill and milled. (Dispersing may optionally be carried out in a ZSK kneader or in a pestle kneader.)

After the polymer/pigment mixture has become thermoplastic and the pigment has been completely enclosed, the mixture is milled for another 10 to 15 minutes. Then the masterbatch sheet is taken off and allowed to cool. The sheet is then ground to a powder with a particle diameter of about 1 mm.

EXAMPLE 3

Production of a red acrylic glass panel

Formulation 984 g of methyl methacrylate prepolymer (about 1,000 cp);
10 g of dry pigment preparation (red, produced according to Example 2);
5 g of triallyl cyanurate; and
1 g of 2,2-azobis-isobutyronitrile The dry pigment preparation is incorporated into the initially colorless formulation by stirring and is vigorously stirred in an agitator for 2 hours, allowed to stand for 15 minutes, and then poured into a cell formed by two silicate glass plates spaced 3 mm apart and polymerized for 15 hours at 45° C. in a water bath. Final polymerization is carried out in an annealing cabinet at 120° C. The nontransparent red acrylic glass panel obtained after cooling and removal from the mold exhibits optimum pigment dispersion and, after heating to forming temperature and after stretching, has a flawless surface.

EXAMPLE 4

Preparation of a polymeric binder containing components (a), (b), and (c)

Formulation 673 g of methyl methacrylate;
200 g of methyl acrylate;
1 g of 2,2'-azobis-isobutyronitrile;
72 g of 2-hydroxyethyl methacrylate;
29 g of 2-dimethylaminoethyl methacrylate; and
2 g of dodecyl mercaptan.

Preparation is carried out as in Example 1.

EXAMPLE 5

Preparation of a brown dry pigment composition

Formulation 242 g of the polymeric binder prepared as in Example 4, ground;
150 g of titanium dioxide;
43 g of cadmium selenide;
10 g of beta-phthalocyanine blue; and
39 g of iron oxide red.

Production is carried out as described in Example 2.

EXAMPLE 6

Production of a dark-brown acrylic glass panel

Formulation 993.2 g of methyl methacrylate prepolymer (about 1,000 cp);
5.0 g of brown pigment preparation according to Example 5;
0.1 g of glycol dimethyacrylate;
1.0 g of 2,2-azobis-isobutyronitrile;
0.5 g of bis-2,2,6,6,-tetramethyl-4-piperidyl sebacate; and
0.2 g of lecithin-based lubricant.

Production is carried out as described in Example 3. The brown acrylic glass panel so obtained exhibits optimum pigment dispersion and an even more uniform surface and appearance than the panel obtained in Example 3. The preparations of the invention according to Example 5 thus make it possible to secure homogeneous dispersion of pigments of different particle sizes, particle shapes and particle densities and with a different particle size distribution within a PMMA panel.

EXAMPLE 7

Preparation of a polymeric binder containing components (a), (b), and (c)

Formulation 724 g of methyl methacrylate;
200 g of methyl acrylate;
50 g of 3-dimethylamino-2,2-dimethylpropyl-1-methacrylate;
25 g of dodecyl mercaptan; and
1 g of 2,2-azobis-isobutyronitrile.

The same procedure is followed as in Example 4.

EXAMPLE 8

Preparation of a white dry pigment compositions

Formulation 242 g of the polymeric binder according to Example 7, ground and
242 g of titanium dioxide.

Production is carried out as described in Example 2.

EXAMPLE 9

Preparation of a white acrylic glass panel

Formulation 989 g of methyl methacrylate prepolymer (about 1,000 cp);
10 g of white pigment preparation of Example 8;
0.1 g of glycol dimethacrylate;
1.0 g of 2,2-azobis-isobutyronitrile.

Production is carried out as described in Example 3.

EXAMPLE 10

Preparation of a polymeric binder containing components (a), (b) and (c)

Formulation 778 g of methyl methacrylate,
150 g of methyl acrylate,
50 g of methacrylic acid,
2 g of dilauroyl peroxide and
20 g of 2-ethylhexyl thioglycolate.

Preparation is carried out as in Example 1.

EXAMPLE 11

Preparation of a polymeric binder containing components (a), (b) and (c)

Formulation 769 g of methyl methacrylate,
200 g of methyl acrylate,
20 g of n-isopropyl-methacrylamide,
10 g of thioglycol and
1 g of 2,2-azobis-isobutyronitrile.

Preparation is carried out as in Example 1.

EXAMPLE 12

Preparation of a polymeric binder containing components (a), (b) and (c)

Formulation 674 g of methyl methacrylate,
200 g of methyl acrylate,
100 g of 2,2,6,6,-tetramethyl-piperidyl-4-methacrylate,
25 g of dodecyl mercaptane and
1 g of 2,2-azobis-isobutyronitrile.

Preparation is carried out as in Example 1.

EXAMPLE 13

Preparation of a polymeric binder containing components (a), (b) and (c)

Formulation 769 g of methyl methacrylate,
200 g of methyl acrylate,
20 g of γ-methacryl-oxypropyl-trimethoxysilane,
10 g of thioglycol and
1 g of 2,2-azobis-isobutyronitrile.

Preparation is carried out as in Example 1.

EXAMPLE 14

Preparation of a polymeric binder containing components (a), (b) and (c)

Formulation 739 g of methyl methacrylate,
200 g of methyl acrylate,
50 g of glycidyl methacrylate,
10 g of thioglycol and
1 g of 2,2-azobis-isobutyronitrile.

Preparation is carried out as in Example 1.

What is claimed is:

1. A color concentrate, suitable for dispersion in a synthetic resin for coloring the same, said concentrate comprising a colorant dispersed in a polymer as a binder for said colorant, said polymer consisting essentially of
   (a) 70–90 percent, by weight of the polymer, of methyl methacrylate,
   (b) 10–20 percent, by weight of the polymer, of methyl acrylate, and
   (c) at least 0.1 percent, by weight of the polymer, of at least one free radically polymerizable monomer of the formula $$H_2C=C-C-R_2,$$
with $R_1$ on the middle carbon and $O$ double-bonded

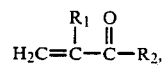

wherein $R_1$ is hydrogen or methyl and $R_2$ is a member selected from the group consisting of
   (i) $-NR_3R_4$, wherein $R_3$ and $R_4$, taken alone, are the same or different and are hydrogen or linear or branched alkyl having 1 to 5 carbon atoms, and $R_3$ and $R_4$, taken together with the nitrogen atom to which they are bonded, form a 5- or 6-membered heterocycle or such a heterocycle containing further nitrogen or oxygen atoms, and
   (ii) $-Y-X-NR_3R_4$, wherein Y is oxygen or $-NR_5-$, X is linear or branched alkylene having 2 to 10 carbon atoms or is cycloalkylene, and $R_5$ is hydrogen or alkyl having 1 to 6 carbon atoms.

2. A polymer, suitable as a binder in the formulation of color concentrates, consisting essentially of
   (a) 70–90 percent, by weight of the polymer, of methyl methacrylate,
   (b) 10–20 percent, by weight of the polymer, of methyl acrylate, and
   (c) at least 0.1 percent, by weight of the polymer, of at least one free radically polymerizable monomer of the formula

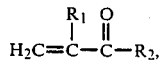

wherein $R_1$ is hydrogen or methyl and $R_2$ is a member selected from the group consisting of
   (i) $-NR_3NR_4$, wherein $R_3$ and $R_4$, taken alone, are the same or different and are hydrogen or linear or branched alkyl having 1 to 5 carbon atoms, and $R_3$ and $R_4$, taken together with the nitrogen atom to which they are bonded, form a 5- or 6-membered heterocycle or such a heterocycle containing further nitrogen or oxygen atoms, and (ii) $-Y-X-NR_3R_4$, wherein Y is oxygen or $-NR_5-$, X is linear or branched alkylene having 2 to 10 carbon atoms or is cycloalkylene, and $R_5$ is hydrogen or alkyl having 1 to 6 carbon atoms.

3. A color concentrate as in claim 1 wherein component (c) is (c) (i).

4. A color concentrate as in claim 8 wherein Y is oxygen.

5. A color concentrate as in claim 3 wherein X is alkylene having two or three carbon atoms.

6. A color concentrate as in claim 3 wherein X is branched alkylene having a tertiary carbon atom.

7. A color concentrate as in claim 3 wherein X is 2,2-dimethylpropyl.

8. A color concentrate as in claim 1 wherein component (c) is (c) (iv).

9. A color concentrate as in claim 8 wherein Y is oxygen.

10. A color concentrate as in claim 8 wherein X is alkylene having two or three carbon atoms.

11. A color concentrate as in claim 8 wherein X is branched alkylene having a tertiary carbon atom.

12. A color concentrate as in claim 8 wherein X is 2,2-dimethylpropyl.

13. A color concentrate as in claim 1 wherein the ratio by weight of component (a) to component (b) is from 6:1 to 3.3:1.

14. A color concentrate as in claim 1 wherein the ratio by weight between the components (a), (b), and (c) is $4.2\pm0.7:1:0.3\pm0.2$.

15. A color concentrate as in claim 1 wherein component (c) is present in an amount from 1 to 6 percent by weight of the polymer.

16. A polymer as in claim 2 comprising at least one percent by weight of component (c).

* * * * *